Dec. 27, 1938.  T. LARSSON  2,141,608

PULPSTONE

Filed Aug. 11, 1937

Inventor

THURE LARSSON

By George Compton

Attorney

Patented Dec. 27, 1938

2,141,608

UNITED STATES PATENT OFFICE 2,141,608

PULPSTONE

Thure Larsson, Worcester, Mass., assignor to Norton Company, Worcester, Mass., a corporation of Massachusetts Application August 11, 1937, Serial No. 158,494

1 Claim. (Cl. 51—206)

The invention relates to segmental grinding wheels, and with regard to its more specific features to pulpstones.

One object of the invention is to provide a stronger pulpstone. Another object of the invention is to eliminate breakage due to torsional stresses. Another object of the invention is to improve the pulpstone described in my prior Letters Patent No. 2,074,114 and prior patent to George N. Jeppson No. 2,032,484. Other objects will be in part obvious or in part pointed out hereinafter.

The invention accordingly consists in the features of construction, combinations of elements and arrangements of parts, as will be exemplified in the structure to be hereinafter described, and the scope of the application of which will be indicated in the following claim.

Figure 1:
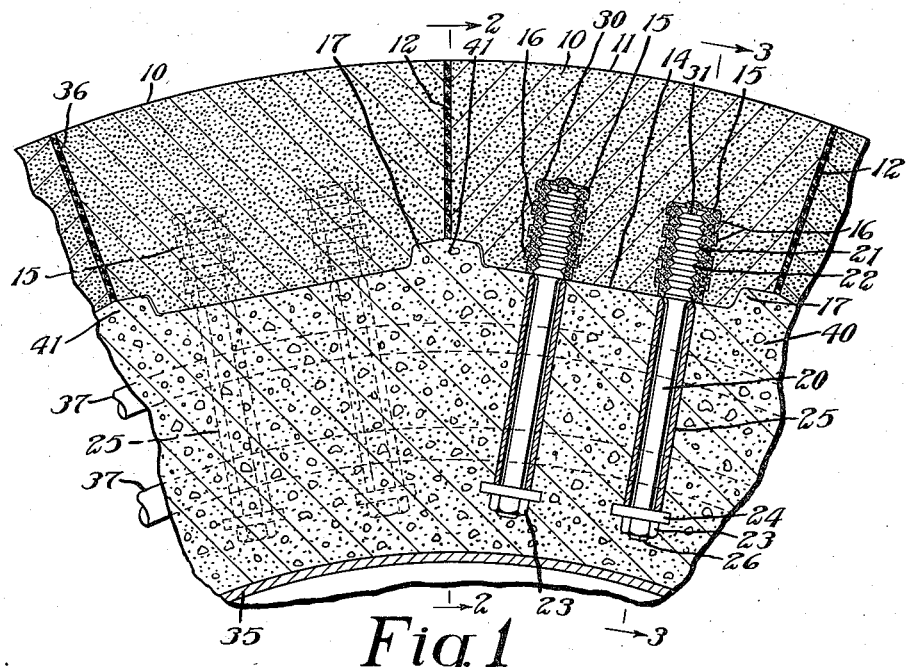
Figure 2:
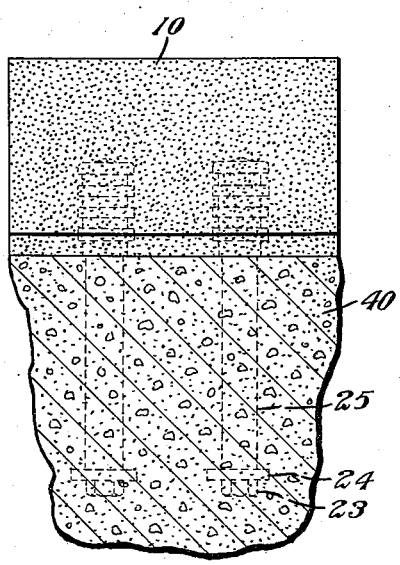
Figure 3:
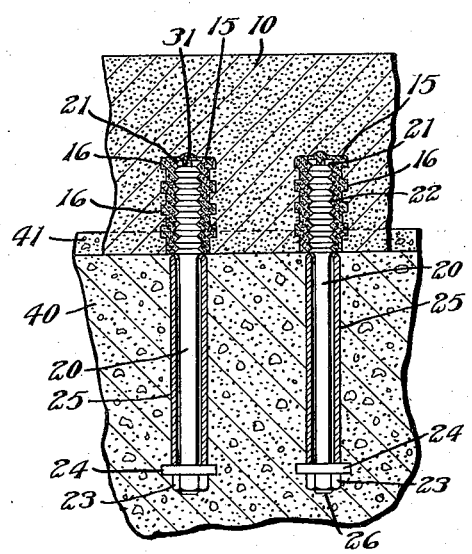

In the accompanying drawing illustrating one of many possible embodiments of the mechanical features of this invention, Figure 1 is a fragmentary cross sectional view of the improved pulpstone, Figure 2 is a longitudinal sectional view taken on the line 2—2 of Figure 1, and Figure 3 is a longitudinal sectional view taken on the line 3—3 of Figure 1.

The improved construction may be embodied in many different types of pulpstones but is particularly applicable to those of the patents hereinbefore mentioned. The present invention is herein shown as embodied in the type of pulpstone construction disclosed in Figure 3 of my prior U. S. Letters Patent No. 2,032,484.

As described in Patent No. 2,032,484, I provide a number of segmental blocks 10 of bonded abrasive material. Each segment of bonded abrasive material is composed of any desired type of abrasive, such as quartz, silicon carbide and fused alumina, the latter being preferred, bonded together with suitable bonding material, vitrified ceramic bond being preferred. Each segment 10 is, therefore, formed of a mixture of clay or frit with abrasive, suitably plasticized as by the provision of a suitable amount of plastic clay and the addition of water, then molded in a suitable mold and pressed under high pressure to cause the segment to have sufficient "green" strength for handling. After each segment 10 comes from the mold, it has an outer cylindrical surface 11 bounded by radial surfaces 12 and, as shown in Figure 2, flat end surfaces 13 and, as shown in Figure 1, a plane segmental surface 14. While the segment 10 is in a "green" state, I bore four holes 15 therein, each hole 15 having grooves 16 in its side walls. I then form reentrant grooves 17 in the inside corners where the radial faces 12 join the segmental face 14. Each groove 17 is adjacent a corresponding groove 17 in the adjacent segment.

The segments 10 are then fired in a kiln and the shape thus becomes permanent and the material is thereby converted to vitrified bonded abrasive material. I provide a quantity of bolts 20 having heads 21 with grooves 22. I further provide an equal quantity of nuts 23, washers 24 and sleeves 25. In accordance with the disclosure in my aforesaid Letters Patent No. 2,032,484, I place the sleeves 25 on the bolts 20 abutting the heads 21. I then place the washers 24 against the ends of the sleeves 25, place the nuts 23 upon the outer threaded ends 26 of the bolts 20 and tighten the nuts 23. Thereby the bolts 20 are placed under initial tension.

I then place in each hole 15 a head 21 of a bolt 20 and fill the space with a suitable self-setting cement such as a mixture of Portland cement and iron filings. This has excellent holding power. Each segment 10 thus has four bolts 20 projecting therefrom, each bolt being encased by a sleeve 25 and having attached to it a washer 24. Each bolt 20 is under initial tension such that a considerable force is needed to move the head 21 away from the washer 24 by even a very slight distance. Each bolt 21 is securely locked to its segment 10 by reason of the fact that the cement 30 interlocks with the grooves 16 in the segment and also interlocks with the grooves 22 in the head 21. Each head 21 of each bolt 20 has the equivalent of a screw slot 31 which interlocks the bolt with the segment against torsional stresses.

As described in the prior patents herein referred to, I provide a central metal drum 35 and arrange the segments 10 around it in rows with a suitable filler material 36 such as described in by prior Patent No. 2,054,771 between segments. I locate a plurality of steel reinforcing hoops 37 suitably wired together and forming in effect a cage within the cylindrical space bounded by the segments 10 and outside of the central metal drum 35. The cage formed of the hoops 37 can be placed in position around the metal cylinder 35, then the segments built up around it with pairs of bolts 20 between successive levels of hoops 37. I use any temporary holding members such as clamps to hold the segments 10 closely together during construction of the pulpstone. I then pour concrete 40 in position between the metal cylinder 35 and the segments 10 and allow it to set.

The stone is now substantially complete except for features of construction relating to the mounting which need not herein be described. Before any given segment 10 can move outwardly by even so much as a fraction of a thousandth of an inch the initial tension of the bolts 20 has to be overcome. Furthermore, torsional movement between the cement center 40 and the segments 10 is virtually eliminated by reason of homogeneous integral keys 41 located in the grooves 14. These keys 41 considerably strengthen the stone and make it rigid in all respects. Nevertheless in case of overheating expansion is taken care of by the bolts 20 which, being of small cross sectional area, constitute elastic bolts.

The construction herein described achieves the advantages of great strength without weakening the segments 10 and at the same time provides a structure that is readily able to resist torsional stresses. When the logs in a pulp grinding machine are suddenly jammed against the face of the stone by shifting of the ram of the machine and while the stone is rapidly being rotated, torsional stresses of great magnitude are set up. Stones constructed in accordance with the present invention are well able to resist such torsional stresses and at the same time are strong in other respects, being particularly adapted to resist the effects of overheating.

It will thus be seen that there has been provided by this invention an article in which the various objects hereinbefore set forth together with many thoroughly practical advantages are successfully achieved. As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:—

A segmental pulpstone comprising a hollow monolith of concrete, a plurality of segments surrounding and in contact with said hollow monolith, the periphery of the segments constituting a cylindrical grinding surface each segment being formed of bonded abrasive material, a plurality of securing means securing the segments to the concrete there being a plurality of the securing means for each segment, each securing means comprising an elastic bolt under initial tension, a sleeve surrounding each bolt placing it under tension, a washer at one end of each sleeve and a head beyond each sleeve which is cemented into the segment both the sleeve and the washer being embedded in the concrete, the monolith having a plurality of key ridges extending parallel to the axis of the cylindrical grinding surface, each segment having a pronounced reentrant groove at each end extending parallel to the axis of the cylindrical surface, the key ridges being received between segments and projecting outwardly of the major inner surface of the segments into the reentrant grooves, the segments being thus keyed to the hollow monolith of concrete by the key ridges which extend to either side of the geometrical planes bounding the segments.

THURE LARSSON.